United States Patent
Reese et al.

(10) Patent No.: US 6,877,395 B2
(45) Date of Patent: Apr. 12, 2005

(54) PARKING-BRAKE MECHANISM FOR VEHICLES AND METHOD OF INSTALLATION

(75) Inventors: Eckhard Reese, Apensen (DE); Thomas Röpke, Stelle-Ashausen (DE)

(73) Assignee: DaimlerChrysler AG, Stuttgart (DE)

( * ) Notice: Subject to any disclaimer, the term of this patent is extended or adjusted under 35 U.S.C. 154(b) by 222 days.

(21) Appl. No.: 10/325,435

(22) Filed: Dec. 20, 2002

(65) Prior Publication Data

US 2003/0115982 A1 Jun. 26, 2003

(30) Foreign Application Priority Data

Dec. 21, 2001 (DE) .......................................... 101 63 043

(51) Int. Cl.⁷ .............................. F16C 1/10; B60T 1/00; G05G 1/14
(52) U.S. Cl. ................... 74/512; 74/501.5 R; 74/502.4; 74/502.6; 188/2 D
(58) Field of Search ............................ 74/502.4, 501.5, 74/502.6, 512; 188/2 D; 29/402.01, 402.08, 402.03, 402.04; 403/310, 30 G, 318, 319

(56) References Cited

U.S. PATENT DOCUMENTS

| | | | | |
|---|---|---|---|---|
| 4,624,155 A | * | 11/1986 | Wing ..................... | 74/501.5 R |
| 5,235,867 A | * | 8/1993 | Wortmann et al. ...... | 74/501.5 R |
| 5,983,745 A | * | 11/1999 | Petrak ........................ | 74/502.4 |
| 6,213,259 B1 | * | 4/2001 | Hanson et al. .............. | 188/156 |
| 2003/0227010 A1 | * | 12/2003 | Petrak ........................ | 254/294 |

FOREIGN PATENT DOCUMENTS

| | | | |
|---|---|---|---|
| DE | 43 02 250 | 7/1994 | |
| JP | 11-93937 | * 4/1999 | ................ 74/502.4 |

* cited by examiner

*Primary Examiner*—Vinh T. Luong
(74) *Attorney, Agent, or Firm*—Klaus J. Bach

(57) ABSTRACT

In a parking brake mechanism and installation method of the mechanism in a vehicle, the mechanism includes a wind-up device for tightening a brake cable which wind-up device can be locked by a locking member to prevent tightening during installation. The brake cable comprises two sections, which are joined outside the vehicle by a coupling member, which is installed while the windup device is locked. The locking member includes a break-structure so that, upon installation of the coupling member, the locking member can be broken by pulling on the brake cable to permit the brake cable to be tightened thereby rendering the parking brake mechanism operational.

11 Claims, 2 Drawing Sheets

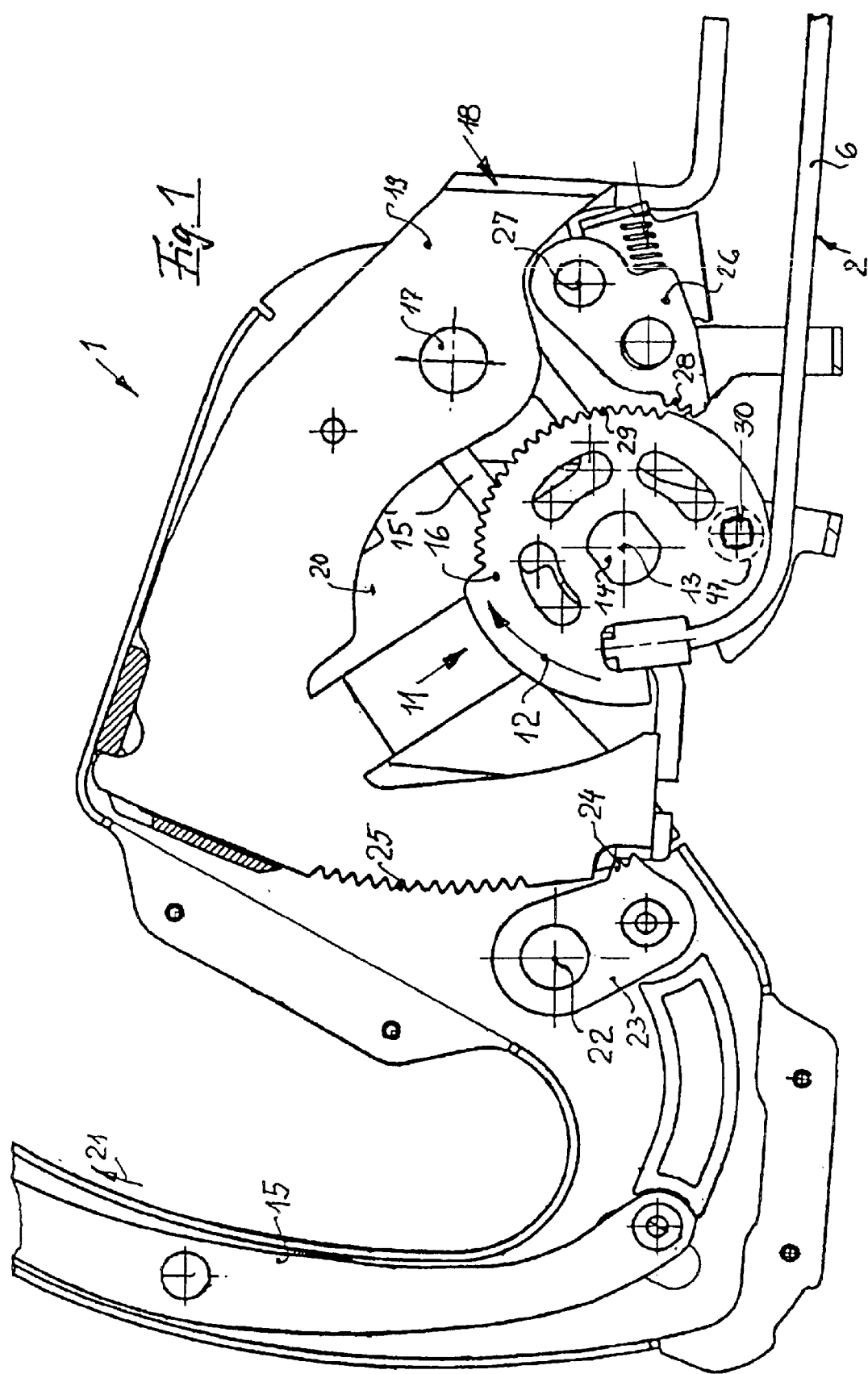

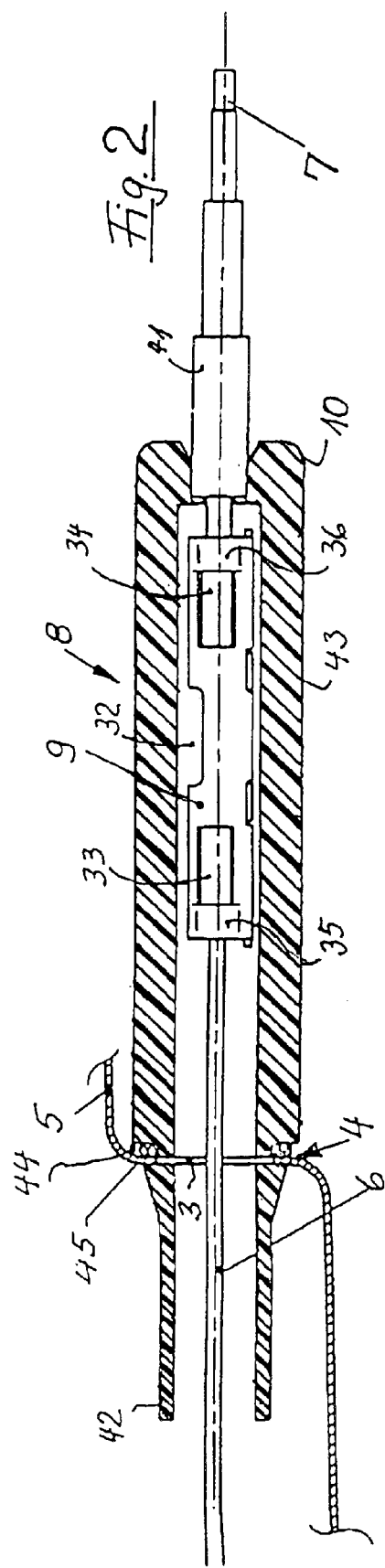
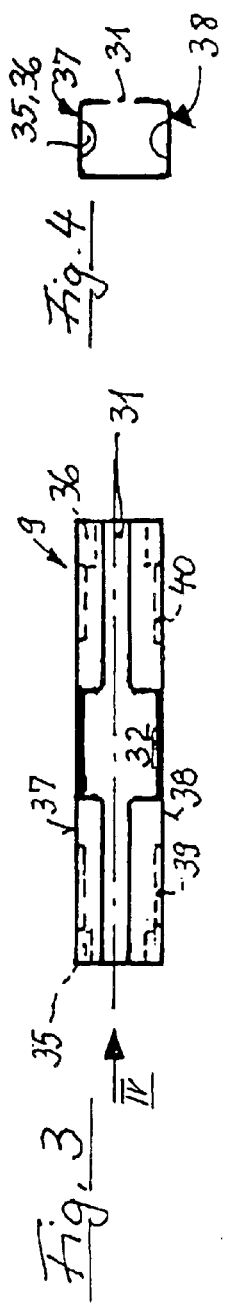
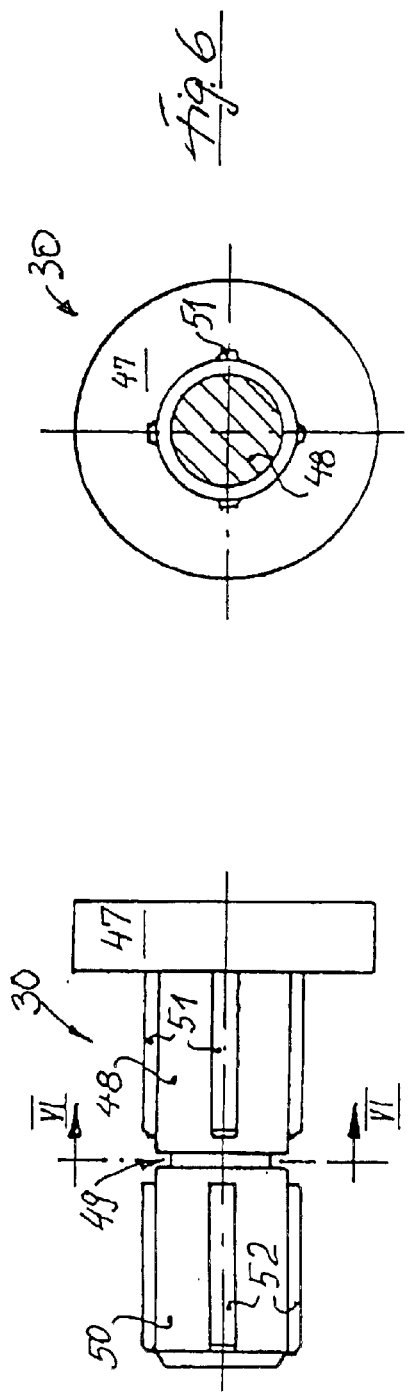

PARKING-BRAKE MECHANISM FOR VEHICLES AND METHOD OF INSTALLATION

BACKGROUND OF THE INVENTION

The invention relates to a parking-brake mechanism for vehicles, in particular passenger cars, including a cable connection and a brake lever latchable to a cable tensioning element and to an installation method for such parking-brake mechanism.

Parking-brake mechanisms of the type mentioned above are disclosed in DE 43 02 250 A1. With regard to their resetting functions, the cable-tensioning element, which is in latchable lock-in connection to the actuating lever, is resiliently pre-tensioned in the actuating direction of the actuating lever, in the tensioning direction of the cable-control connection when the brake is actuated. Via this resilient pretensioning, cable slack is also avoided when the brake device is not actuated. As a result, during the installation of the parking-brake device in the vehicle, the pretensioning force acting on the cable control has to be overcome when the connection between the actuating device and the brake mechanism is installed. This makes the installation more difficult, particularly since the actuating device lies within the vehicle and the cable control extends outside the vehicle body to the respective brakes. As a result, work has to be carried out firstly in the vehicle and secondly under the vehicle, which increases the outlay for the installation.

Therefore, the known design includes a cable-tensioning element, which is resiliently loaded in the tensioning direction of the control cable. It is supported, in an installation position of the actuating device, which position is in front of an initial actuating position of the mounted brake device, in a displacement-restricted manner in the tensioning direction, so that for the installation that section of the cable control which originates from the cable-tensioning element is present in a slack and tension free manner in an excess length. This makes it possible to complete the control cable connection. When the latter is completed, the displacement-restricting stop member is then removed from its stop position. As a stop member which merely restricts displacement in the tensioning direction, a locking pin is provided which intercepts the pivoting path of the cable-tensioning element and restricts the latter in the actuating direction, which corresponds to the spring-pretensioning direction, but leaves it free in the opposite direction.

It is the object of the invention to provide a parking-brake device of the type mentioned above in such a manner that, along with a simple construction, improved installation conditions are achieved.

SUMMARY OF THE INVENTION

In a parking brake mechanism and installation method of the mechanism in a vehicle, the mechanism includes a wind-up device for tightening a brake cable which wind-up device can be locked by a locking member to prevent tightening during installation. The brake cable comprises two sections, which are joined outside the vehicle by a coupling member, which is installed while the windup device is locked. The locking member includes a break-structure so that, upon installation of the coupling member, the locking member can be broken by pulling on the brake cable to permit the brake cable to be tightened thereby rendering the parking brake mechanism operative.

The broken halves of the locking member are retained in the initial state and in the broken state, in a captivated secure manner.

In accordance with the intended use, the loading limit of the breaking element depends on the spring force to be supported in the installation position, which is greater than the spring force by a certain safety margin, so that additional forces occurring by chance during the installation process can be accommodated by the breaking element. On the other hand, the predetermined breaking force should preferably not be too far above the value required by the spring force, in order to be able to shear off the breaking element when a force is applied to the breaking element by pulling on the control cable connection.

In the case of the design according to the invention, this can be used in order to complete the installation process, after the control cable connection between the cable-tensioning element has been established and the member which is to be acted upon and is part of the brake has been sheared off, and the control-cable connection is tensioned via the cable-tensioning element, which is spring-loaded in the tensioning direction. As a result, the actuating device can be mounted to the parking-brake device in the vehicle interior, and that section of the control cable, which is connected to the actuating device, extends from the vehicle interior, for example through a floor opening. The parking-brake is connected to the brake-side control cable section of the control cable outside the vehicle by a cable coupling device. In this way, the working procedures which are to be undertaken within and outside the vehicle are separated. The brake activation can also be undertaken in conjunction with the coupling, which takes place from below the vehicle, so that the actuating device does not have to be accessed again for this purpose in the interior, which might require the cooperation of a number of people.

The design and arrangement of the breaking element is also used for further simplification of the working procedure, in particular for carrying out the activation of the parking-brake device by shearing off the breaking element in such a manner that the breaking element assumes a secured fixed position also when broken. The broken halves are held captive in secured positions. It has been found to be expedient to use as the breaking element a shear bolt which consists, in particular, of plastic and which, with its bolt parts disposed at both sides of the breaking point, is held in a correspondingly secured manner. Securing it in this way can be achieved in a simple manner by the bolt-like predetermined breaking element being designed such that it is provided with ribs at the circumference in particular with longitudinally extending ribs so that when it is inserted into corresponding receiving openings, a claw-type connection is established.

It has also been found to be expedient to arrange the breaking element, which is in particular a shear bolt, so as to extend between the cable-tensioning element and the part supporting the latter. After installation, this part is no longer in that region of the cable-tensioning element through which the breaking element passes. As a result, in spite of the parts of the breaking element which have been separated from one another by the shearing-off procedure being retained in the corresponding receiving parts, they do not inhibit the operation. The breaking element should have smooth breaking surfaces, which can be achieved for example, by providing corresponding notches or the like in correspondingly brittle material areas. It may therefore be expedient to embrittle the predetermined breaking element in the intended region of breaking. For the positional securing and ease of fitting, a softer, plastically and/or elastically deformable material structure is expedient outside the intended break areas in particular in the region of rib structures.

With regard to simplifying the installation, it is furthermore expedient to join the sections of the control cable by a coupling connection including a cable connector with a longitudinally slotted attachment profile and a central insert opening and end-side stops, which are offset axially with respect to the insert opening for the thickened ends sections of the cable. Adjacent to the stops and situated in front of the latter, the attachment profile preferably includes recesses in the opposite side walls which end in a longitudinal slot. The recesses form latching openings for the thickened cable end sections, so that, after the insertion procedure, by moving the thickened end sections towards the stops, the cable sections are fixed with respect to one another via the cable connector.

The coupling connection provided according to the invention is disposed outside the vehicle interior, that is the cable extends to the outside, for example, through a floor opening, in particular in a step of the floor, so that there are good access possibilities for joining the cable sections. If the coupling connection should be disposed in a protected location within the vehicle, a longer adjusting paths between the installation position would be required. Although the adjusting paths can, in principle, be established, this can only be done with difficulties and considerable outlay. The invention therefore also proposes a solution, which makes a protected arrangement of the coupling connection outside the passenger compartment possible in an expedient manner, and with little outlay.

To this end, the cable connector is preferably disposed in the operating state of the parking brake, in a tubular protective sleeve which covers the passage region of the cable section through the vehicle body. Preferably, the protective sleeve is supported in the area where the cable section extends through the vehicle body. The body forms the support for the outer sheath of the continuing cable section which is for example a Bowden cable.

It is expedient if the protective sleeve is supported at its end on the vehicle body by a neck-shaped tapering snout which is inserted into the opening in the vehicle body and is preferably connected to the latter in such a manner that a sealing closure towards the vehicle body is achieved.

The protective body can expediently be a compression-resistant part, in particular of plastic or sufficiently compression-resistant foam or rubber material. The length of the protective sleeve is preferably selected so that the cable connector is disposed within the protective sleeve, including its snout-like extension and, in all positions of the actuating device, the protective sleeve at the same time forms a guide element for the cable connector.

The invention will be described below in greater detailed with reference to the accompanying drawings.

BRIEF DESCRIPTION OF THE DRAWINGS

FIG. 1 is a diagrammatic illustration of a parking brake mechanism for vehicles, including a control cable connection, which extends from its actuating device, to the wheels to be braked, FIG. 2 is a diagrammatic sectional illustration of the coupling connection disposed in the control cable connection, between cable sections which are to be joined to one another, and a tubular protective sleeve enclosing the coupling connection, FIG. 3 is a diagrammatic view of the cable connector for the coupling connection, FIG. 4 is an end view of the cable connector according to FIG. 3 as seen in the direction of the arrow IV in FIG. 3, and FIG. 5 show the breaking element which is part of the cable-tensioning element of the actuating device and forms a stop member in a side view and FIG. 6 is a sectional view taken along line VI—VI of FIG. 5.

DESCRIPTION OF PREFERRED EMBODIMENTS

The actuating device of a parking-brake for vehicles, in particular passenger cars, is denoted by the reference numeral 1. As a rule, the actuating device 1 is arranged together with the other control elements of the vehicle in the vehicle interior, in particular in the vehicle passenger compartment, and acts on the wheels to be braked via a control cable connection 2, only part of which is illustrated. The control cable connection 2 is guided—as indicated in FIG. 2—from the vehicle interior to the outside—that is, to the wheels to be braked, via a vehicle opening 3 which is preferably formed in a step 4 of the vehicle floor 5. The control cable connection 2 comprises two control cable sections 6 and 7 which are to be coupled to each other and are joined via a coupling connection 8, the coupling connection 8 having a cable connector 9 disposed in a protective sleeve 10. The coupling connection 8 will be described in further detail below.

The control cable section 6 is connected at the actuating device 1 to a cable-tensioning element 11 which is designed in the exemplary embodiment as a cable wind-up disc 16, which is spring-loaded in the tensioning direction (arrow 12). The axis of rotation of the cable-tensioning element 11, that is the cable wind-up disc 16, is denoted by 13. The axis of rotation 13 coincides with the axis of a shaft 14, which is mounted rotatably in the brake lever 15, the shaft 14 being connected in rotationally fixed manner to the cable-windup disc 16 via a non-circular cross-section joint and via a spring (not illustrated). The shaft may also be supported against the brake lever 15 in the tensioning direction according to arrow 12 via another spring, which tensions in the direction of rotation. The brake lever 15 includes bearing brackets 15' by way of which it is supported by a shaft 17 on a support console 18, which is fastened to the vehicle body, specifically by way of its support plate 19. The support plate 19 extends approximately parallel to the pivot plane of the brake lever 15, and the supporting plate 19 has a cutout 20 in which the cable-windup disc 16 is disposed and which provides sufficient clearance for the cable-windup disc 16 to shift the disc when the brake lever 15 is pivoted during setting of the brake. The actuating direction of the brake lever 15 during tensioning of the brake cable is indicated by the arrow 21.

A locking pawl 23 is also mounted on the brake lever 15 in a manner such that it can pivot about a pivot axis 22. The locking pawl is spring-loaded in a pivoting direction towards the support plate 19. When the brake is actuated by pivoting of the brake lever 15 about the axis 17 in the direction of the arrow 21, the locking teeth 24 move into an overlapping position with a tooth structure 25 of the support plate 19. By interaction of the locking teeth 24 with the tooth structure 25 upon pivoting of the brake lever 15 in the direction of the arrow 21 a particular tensioning position is secured and the brake lever 15 is prevented from pivoting back in the direction opposite to the actuating direction (arrow 21).

A further, pawl-like locking element 26 is mounted on the brake lever 15 in such a way that it is pivotable about an axis 27. This locking element 26 is spring-loaded toward the cable-winding disc 16. The locking teeth 28 of the locking element 26 cooperate with a circumferential tooth structure 29 on the cable-winding disc 16, which results in a latching connection, which only locks in the opposite direction to the tensioning direction according to arrow 12. The cable-control connection 2 is therefore held under a certain pre-tensioning preventing cable, slack. Also the brake is automatically adjusted via the cable-winding disc 16 in accordance with the spring-loading in the tensioning direction (arrow 12).

This tensioning function is blocked, for installation, via a locking member 30, which will be explained in greater detail below with reference to FIGS. 5 and 6. The locking member 30 is a breaking element in the form of a shear bolt which blocks the cable-winding disc 16 in its rotation, specifically in a rotational position ahead of the circumferential tooth structure 29 of the cable-winding disc 16 counter to the tensioning direction so that a meshing locking engagement between the locking element 26 and the cable-winding disc 16 cannot yet be established. This locking position, which is secured via the locking member 30, expediently corresponds to a position of the brake lever 15 relative to the tooth structure 25 of the support plate 19, in which the locking pawl 23 is positioned ahead of the toothing structure 25.

Since the actuating device 1 of the parking brake is arranged in the vehicle interior the cable-control connection 2 leading to the brakes must extend to the outside of the vehicle. As a result, during installation of the parking-brake device work has to be performed both on the inside and outside of the vehicle. In this regard, it has been found expedient to divide the cable-control connection 2 into at least one cable section 6 connected to the cable-tensioning element 11 that is to the cable-windup disc 16, and a control cable section 7 which extends to the wheel brakes and is preferably in the form of a Bowden cable. The blocking of the cable-windup disc 16, which is achieved via the locking member 30, in an installation position ahead of its working position facilitates the connection of the cable sections 6 and 7 to each other, given an appropriate length, via the coupling connection 8 with the assistance of the cable connector 9 without having to overcome any pre-tensioning.

The cable connector 9 is formed by an elongate attachment member which extends in the direction of the cable axis, has a continuous longitudinal slot 31 and has an insert opening 32 in the center in particular in the longitudinally central region of the attachment member. The insert opening 32 constitutes an enlargement of the longitudinal slot 31 and is dimensioned in such a manner that the thickened cable-end sections 33 and 34 can be inserted into the member. The attachment member, which is adapted in cross-section to the diameters of the cable-end sections 33 and 34, is provided on the ends with stops 35 and 36 for the cable-end portions 33 and 34. The stops 35 and 36 are preferably formed by the lateral profile limbs 37, 38, which are provided with molded areas projecting towards the interior wall of the attachment member 30.

These molded areas, which form the stops 35, 36, are expediently connected, in the longitudinal direction of the cable connector 9, to latch openings 39, 40, which are disposed in front of, and expediently correspond in length to, the thickened cable-end sections 33 and 34. They have cross-sections preferably of such a size that a latching engagement connection of the cable-end sections 33 and 34 and the latch openings 39, 40 is established via the cable connector 9 with a virtually form-fitting coupling of the cable-control sections 6 and 7.

Such a coupling connection 8 comprises, expediently a protective sleeve 10, which is disposed around the cable connector 9 and is longer than the cable connector 9. Its length is preferably so selected that the cable connector 9 is in all of its operating positions within the protective sleeve 10. The protective sleeve 10 also forms the axial support for the outer sheathing 41 of the control cable section 7 against the vehicle body and a sealing closure for the passage opening 3 in the step 4 of the vehicle floor 5. The control cable is preferably a Bowden cable. The protective sleeve 10 protrudes with a snout 42 of reduced external diameter into the vehicle interior. The transition between the snout 42 and the part 43 of the protective sleeve 10, which is disposed on the outside and is enlarged in diameter, has an annular groove 44 via which a latching connection relative to the circumference of the passage opening 3 is achieved. In order to improve the sealing, a seal 45 may additionally be provided in the annular groove 44. It has furthermore been found to be expedient to widen the external diameter of the snout 42 in a cone-like manner toward the annular groove 44.

The compression-resistant sleeve 10 preferably consists of plastics or elastomers having a certain elasticity are particularly suitable as material for the protective sleeve 10. The plastics or elastomers preferably also have a damping effect in order to avoid the transmission of knocking or grinding noises. Such noises may occur in spite of a radial support of the cable connector 9 in the protective sleeve 10, which has some play.

In order that, in spite of the overall of the protective sleeve 10 resulting from the resetting and/or installation path of the cable connector 9, the protective sleeve 10 can cover the cable connector 9 in all of its operating positions but still has a relatively small excess length relative to the vehicle body part containing the opening 3 in the step 4 of the vehicle floor 5, the snout 42 is comparatively long. Also, the cable-control section 6, which originates from the actuating device 1, is only long enough as needed with regard to a comfortable installation.

For this installation, the outer sheathing 41 is pushed back relative to the end section 34 and the protective sleeve 10 is slipped onto the cable section 7. The cable-end sections 33 and 34 are then inserted into the cable connector 9, and the protective sleeve 10 is subsequently moved in the direction toward the opening 3. If appropriate, the snout 42 is inserted into the passage opening 3. The control cable connection 2 is then tightened, preferably by exertion of a transverse force on the cable control connection 2, in particular by a transverse pull. The cable-end sections 33, 34 are now initially latched to the cable connector 9 and the stop member 30, which is a break element, is thereby sheared off. The cable wind-up disc 15 is therefore released and rotates in the tensioning direction 12. An initial position is arrived in this way for the cable wind-up disc 16. In this position, the slack of the control cable connection 2, which is provided during installation, is eliminated. The control cable connection 2 is tightened and is also fixed in an initial position corresponding to this tightening. The cable wind-up disc 16 is locked counter to the tensioning direction according to the arrow 12 via the locking element 26. Thus, when the brake lever 15 is actuated in the brake-actuating direction specified by the arrow 21, the brake can be activated, in which case the respective tensioning position is secured by the interaction of the locking pawl 23, or the teeth 24 thereof, with the tooth structure 25 of the support plate 19. In principle, it is within the context of the invention to shear off the locking member 30 after attaching the cable-end sections 33, 34 in the cable connector 9 by pulling the brake lever 15.

The locking member is a shear bolt 30, which has for example two parts. As shown in FIG. 5 the shear bolt 30 has a first bolt part 48 which is provided with a head 47, and a secured bolt part 50 which is connected to the first bolt part 48 via the predetermined break connection 49. The second bolt part 50 fits in a corresponding receiving hole in the windup disc 16 and the first bolt part 48 together with the head 47 is received in a part of the brake-actuating lever 15, which is situated with respect to the plane of FIG. 1 in front of and adjacent to the support plate 19 and the cable-windup disc 16. When, by application of the tensile force during the installation, the shear bolt 30 shears off with a smooth surface in the region of the connection 49, the second bolt part 50 moves with the windup disc 16 in the tensioning direction 12 and away from the bolt part 48 which is secured in the brake lever 15.

The securing in the cable-windup disc 16 and in the brake lever 15 takes place via corresponding receiving holes in which the respective bolt part 48 or 50 is held in a secured manner. The bolt parts are retained in the exemplary embodiment by ribs 51 and 52, which extend in the axial direction on the bolt parts 48 and 50 and which preferably consist of soft elastic material sprayed onto the brittle base material of the shear bolt 30. However, it is also possible, to provide for the shear bolt 30 an embrittlement merely in the predetermined break area 49, and otherwise to produce the bolt parts 48 and 50 from a material which, inserted into the respective receiving opening, retains the bolt because of its elasticity.

The invention has been illustrated and explained with the cable-tensioning element 11 shown as a cable wind-up disc 16, which is mounted directly on the brake lever 15. However, other solutions lie within the context of the invention. For example, the cable-windup disc may be mounted on a bracket which, for its part, is mounted on the brake-actuating lever, in particular concentrically with the latter and its mount on the support plate of the support console. Furthermore, it is also possible to provide the cable-tensioning element as a sector of a disc, which is supported concentrically with the actuating lever and can be pivoted together with the latter. A sector-shaped design of this type permits relatively large pivoting radii, and taken up a comparable amount of space overall. In particular, it permits also an articulation for the cable-control connection, which provides for an essentially linear displacement of the cable in the direction of the cable-control connection. Finally, the invention may also be used in conjunction with actuating devices, in which the pivoting movement of the brake lever relative to the support plate of the console is transmitted to a cable wind-up disc via a rack drive in which case the cable-winding disc is again preferably arranged concentrically with the brake lever, but the spring biasing the cable-windup disc in the tensioning direction is supported on the support console or respectively, its support plate.

What is claimed is:

1. A parking-brake mechanism (1) for braking vehicle wheels, including an actuating device, a control cable extending from the actuating device to the wheels to be braked, a brake lever connected to the actuating device, a cable-tensioning element in the form of a rotatably mounted cable windup disc structure arranged in a latchable lock-in connection with said brake lever, a control cable section connected to the cable windup disc structure and extending therefrom, said element cable windup disc structure being resiliently biased in a tensioning direction of the control cable and being connected to said cable wind-up disc structure (16) being held in position relative to the brake lever (15) by a locking member (30) in the form of a break element for securing the cable windup disc structure (16) in an installation position in which it does not tighten the control cable section (6) extending from the cable windup disc structure (16), said break element (30) being designed for a particular loading limit beyond which the break element (30) is split into separate parts (48, 50), which, in the broken state of the break element (30), are held captivated in said brake lever (15) and said cable windup structure (16).

2. A parking-brake mechanism according to claim 1, wherein said break element is a shear bolt (30).

3. A parking-brake mechanism according to claim 2, wherein said shear bolt (30) extends between the pivotally mounted windup disc structure (16) and a part of the actuating device (1) on which said windup disc structure (16) is supported.

4. A parking-brake mechanism according to claim 3, wherein said windup disc structure (16) is supported by a support console (18) of the actuating mechanism (1), which support console (18) is mounted to a vehicle body.

5. A parking-brake mechanism according to claim 3, wherein said windup disc structure (16) is mounted on said brake lever (16).

6. A parking-brake mechanism according to claim 3, wherein said wind-up disc structure (16) is mounted on a bearing bracket (15') mounted on said support console (18).

7. A parking-brake mechanism according to claim 6, wherein said bearing bracket (15') is mounted co-axially with the brake lever (15).

8. A parking-brake mechanism for braking vehicle wheels including an actuating device, a control cable connected to said actuating device and extending therefrom to the wheels to be braked, and a brake lever connected to said actuating device disposed in a lock-in connection to a cable-tensioning element from which a first section of the control cable extends and is connected to a second section of the control cable via a coupling connection (8), said coupling connection (8) including as cable connector (9), a longitudinally slotted attachment member having a central part with an insert opening (32) said attachment member including end stops (35, 36) for engaging end sections (33, 34) of said first and second cable sections, said attachment member (9) including latching openings (39, 40) for the cable-end sections (33, 34) arranged in each case adjacent to the end stops (35, 36) of the attachment member (9) at the transition to the insert opening (32), said attachment member (9) having lateral member limbs (37, 38) with cavities extending longitudinally in axial alignment with each other and said latching openings (39, 40) being offset longitudinally and forming latching stops (35, 36).

9. A parking-brake mechanism according to claim 8, wherein said end stops (35, 36) are formed by profiled regions of the attachment member projecting towards the respective control cable section (6, 7).

10. A parking-brake mechanism including a coupling connection for end-side control cable sections according to claim 8, wherein, in the operating state of the parking brake, said coupling connection (8) is disposed in a tubular protective sleeve (10) which, in the region of an opening (32) for the passage of the control cable section (6) through a vehicle body is supported against the latter and which, in the opposite direction, forms a support for an outer sheathing (41) of the continuing control cable section (7), which is in the form of a Bowden cable, said protective sleeve (10) being in the form of a compression-resistant tube, which extends axially beyond said coupling connection (8) in such a manner that the coupling connection (8) is guided within said protective sleeve (10) in all operating positions.

11. A parking-brake mechanism according to claim 10, wherein said protective sleeve (10) forms a tapered snout (42) for insertion, in a latching manner, into said opening (3) of the vehicle body.

* * * * *